April 9, 1968 A. GENTILINI 3,377,072

PORTABLE RECORD PLAYER

Filed Dec. 8, 1966 3 Sheets-Sheet 1

April 9, 1968 A. GENTILINI 3,377,072

PORTABLE RECORD PLAYER

Filed Dec. 8. 1966 3 Sheets-Sheet 3

3,377,072
PORTABLE RECORD PLAYER
Augusto Gentilini, Via dei Mille 36, Rome, Italy
Filed Dec. 8, 1966, Ser. No. 600,179
Claims priority, application Italy, Dec. 11, 1965, 27,341/65
10 Claims. (Cl. 274—1)

ABSTRACT OF THE DISCLOSURE

A record player operable irrespective of its spatial orientation. The device has a movable plate on which a record to be replayed is temporarily laid, upon having been slipped through a slot formed through the casing. To replay a record, said plate is manually shifted and the record is automatically positioned so as to rest, centered, on a turntable driven to rotation by a motor and is retained thereon by a spring-biased pressural member. Said displacement of the plate automatically causes said motor to be started and the pickup to be positioned on the record. Upon completion of playback, all the movable portions of the device are automatically restored to their home positions.

This invention relates to a portable record-player for playing back phonograph records.

More particularly, this invention is directed to a record player for phonograph records having a spiral groove, of the kind in which the record to be played back is slipped into a slot formed in the apparatus, is driven to rotation by a turntable having a record-supporting drum and actuated by a small motor via a friction roller, is held centered on said drum during playback by a presser and is played back by means of a needle carried by a balanced pick-up arm, said needle resting on the record face confronting said turntable.

An object of the invention is to provide a record-player of the kind referred to by resorting to simple and sturdy mechanisms, insensitive to bumps and the spatial posture of the device, according to a compact and self-contained configuration, cheap and readily usable both on a desk or carried by a user or on a car, etc. said device stringently respecting the technical requirements of a faultless operation in any posture along with a high-fidelity re-creation of sound.

The subject-matter of this invention is thus a portable record player comprising a casing, a slot formed through the casing wall for introducing the record to be replayed, a turntable freely rotatably supported within said casing, a small electric motor for driving said turntable to rotation via a friction roller, means for feeding power to said small motor via a switch, a rest drum and a centering cylinder having a conical flare for the record to be replayed, both coaxially mounted with said turntable and solid therewith, a shaped resting plate for temporarily receiving said record before play back and on completion thereof, said plate being positioned above said turntable and spaced apart therefrom, said plate being supported within said casing so as to be capable of being approached to the turntable, resilient means tending to keep said plate spaced apart from said turntable, a pick-up arm with a needle pivotally supported about a pivot having its axis parallel to the axis of rotation of said turntable and capable of a restricted tilting movement about an axis perpendicular to its axis of rotation, resilient means acting on said pick-up arm and tending to keep said needle spaced apart from the turntable plane, openings through said plate for allowing said resting drum to pass therethrough together with said centering cylinder and said pick-up arm when said plate is approached to said turntable, a spring-biased pressure member freely rotatably carried by said plate and overlying said passageway for said resting drum and said centering cylinder and adapted to cooperate with them for holding a record in playback position when said plate is near said turntable, spring-biased members for retaining said plate in said position near said turntable, means for connecting said pick-up arm with said retaining means so that at the end of record-playing, said retaining means are automatically released for disengaging said plate to allow it to revert to the position away of the turntable with the record, and means for closing the switch and feeding said small electric motor and for permitting the shifting of said friction roller from contacting said turntable when said plate is brought to its position near said turntable.

An exemplary and non-limiting embodiment of the inventive record player will be described in more detail thereafter with reference to the accompanying drawing, wherein.

Figures 1, 4:
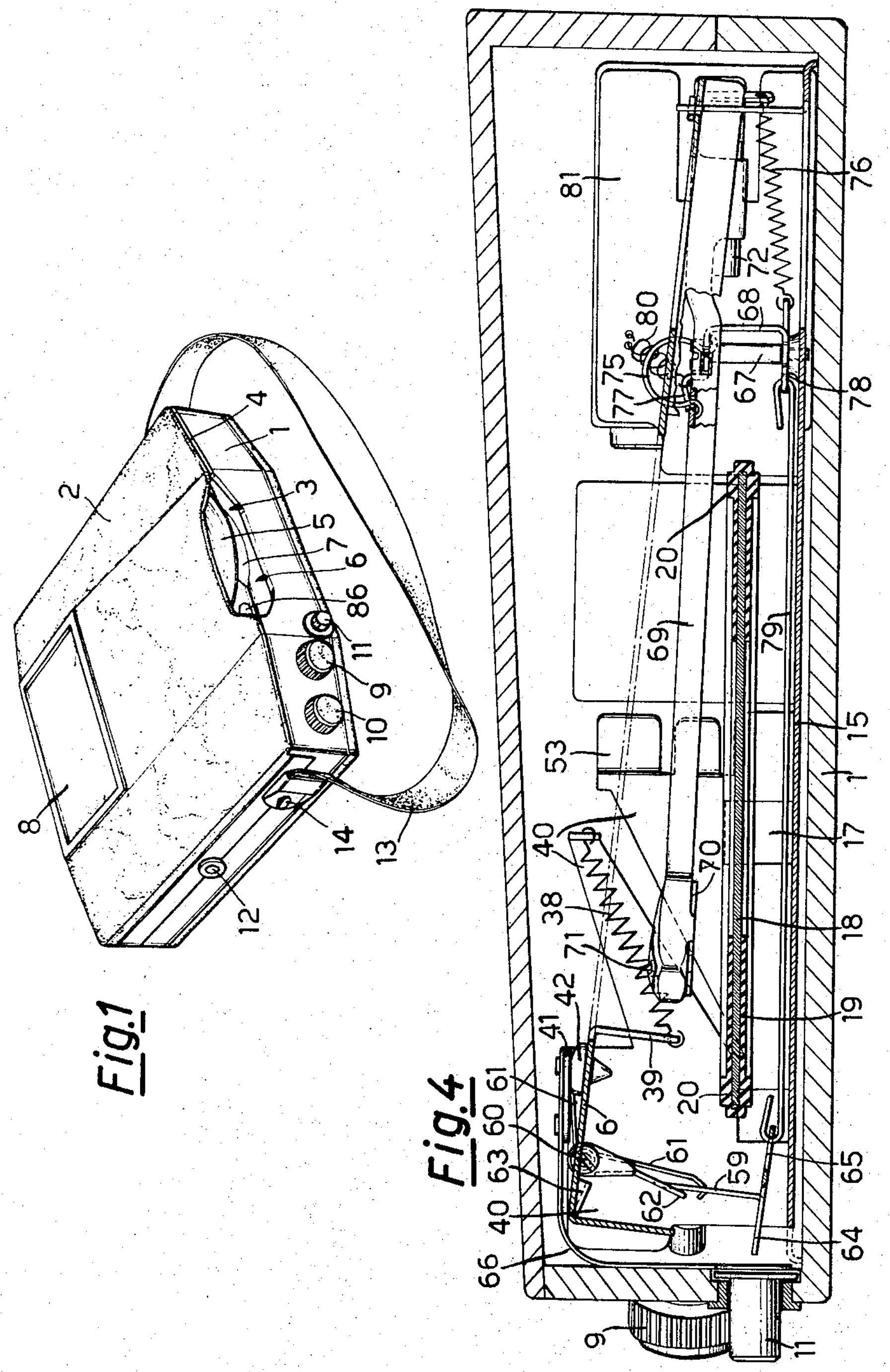
FIGURE 1 is a perspective view of the record-player with a record fed thereinto.
FIGURES 3 and 4 are cross-sectional views, taken along the lines III—III and IV—IV of FIG. 2, respectively.

In the drawings, the record-player is shown laid flat, a position the device could take when, for example, it is laid on a desk: for reasons of clarity, this particular spatial orientation will be referred to in the detailed description to follow. It will nonetheless clearly appear from the ensuing description that the operability of the device is in no wise a function of said particular orientation, nor is it conditioned thereby. It can be said, conversely, that one of the preferred positions of use to which the subject device is directed is just the vertical one, i.e. with the record slot directed upwards.

As can be seen in FIGURE 1, the device comprises an outer casing formed by a lower portion 1 (as viewed in the position as shown) and an upper portion 2, said two portions 1 and 2 being locked together as a unit by means not shown.

In correspondence with the upper front edge (still as viewed in the orientation of the device as depicted in the drawing FIG. 1), and almost centrally, the lower and the upper portions 1 and 2 of said casing are cut away so as to provide a slot 3, to be continued by a slot 4 towards the right, said slot or opening being the record-feeding mouth for slipping a record 5 into the device.

FIGURE 1 shows, through said mouth, a movable plate 6 acting as a temporary rest surface for a record 5 as it is being slipped into the device and before playback, and also immediately after playback, as it will become clearer from the ensuing description. In correspondence with said feeding slot, said movable plate 6 has an undercut 7 which permits a record 5 to be grasped to withdraw it from the device.

The upper portion 2 of the casing has a window, shielded by a grid 8, or the like, for the loudspeaker, to be affixed internally of said casing onto the upper portion thereof.

FIGURE 1 shows, in addition, the control knobs 9 and 10 for controlling the volume and the tone, a push-button 11 for discontinuing the playback at leisure and a socket 12 for connection to a repeater loudspeaker.

A strap 13, affixed to clips such as 14 FIG. 1, is intended to support the device as it is being used by a walking user. In this case, the device has a substantially vertical posture, with the feeding slots 3–4 directed upwards.

Coming now to the description of the inner mechanisms of the device, particular reference should be had to FIGURES from 2 to 4.

A shaped plate, indicated generally at 15 and supporting the whole mechanism, is fastened to the lower portion 1 of the casing. Said plate is stamped out of sheet metal and has a few inwardly curled portions to support the several mechanism component parts.

Figure 3:
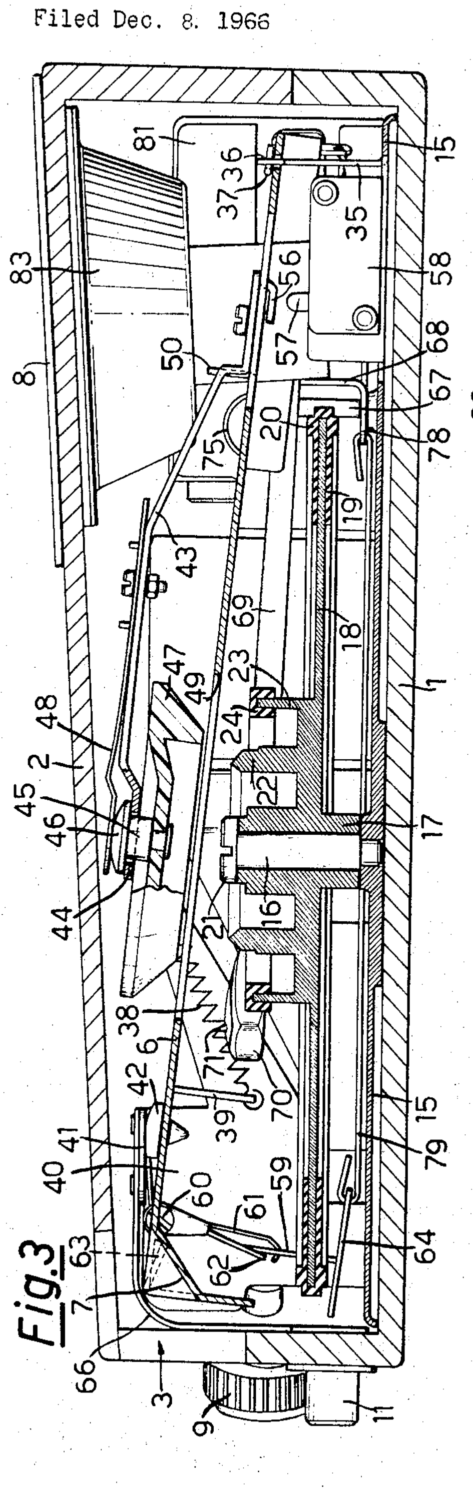

The plate 15 has a fixed pivot 16 having its axis perpendicular to the plane of said plate 15, on said pivot being freely rotatably mounted the hub 17 of a turntable 18 (see more particularly FIG. 3). An annular peripheral zone of the turntable 18 is coated by a rubber gasket 19 with a widened edge 20. The header 21 of the fixed pivot 16 holds the hub 17 of the turntable 18.

Integral with the turntable 18 a cylinder 22 is provided, having a conical free edge and a drum 23 with its free edge coated by a rubber gasket 24, said cylinder-drum assembly being concentrically mounted about the hub 17 of the turntable 18 away of the face thereof confronting the fixed plate 15, the diameter of the cylinder 22 being less than that of the drum 23.

Two curled-in ears 25 and 26 of the plate 15 (see FIGS. 2 and 5) support, by means of rubber pads 27, 28 two coaxial pivots solid with a frame 29 to which a small electric motor, equipped with a centrifugal governor, is affixed. The motor-carrying frame can thus pivot about the axis of said pivots which is parallel to the plane of the fixed plate 15. Two springs 31 and 32 acting between the frame 29 and the fixed plate 15 tend to lower the shaft 33 of the motor 30 towards the plate 15, said pivotal movement being confined by an abutment to be described later. The end of the shaft 33 has a friction roller 34 intended to contact the widened edge 20 of the gasket 19 which peripherally coats the turntable 18.

Two additional curled-in edges of the plate 15, one only of which can be seen in FIG. 3 and is indicated at 35, support the movable plate 6 intended to afford a temporary resting surface for the record to be replayed. More particularly, the narrower end 36 of said edges 35 is caused to pass through elongate slots of said movable plate 6 with a certain clearance so as to permit a limited oscillation to the movable plate 6, the latter resting on the steps formed between said narrower ends 36 and the edges 35. A wire 37 whose curled ends are introduced into openings formed in the ends 36 of the edges 35 and retains the movable plate without hindering the limited oscillations thereof. The shaped plate 6, which is obtained by stamping out metal sheet, has the shape which can be clearly seen in FIG. 2 and has a few portions curled with respect to its plane.

A spring 38 acts from front (on the side away of the support and near the record-feeding slot) on the movable plate 6 between a curled portion 39 thereof and a shaped curled portion 40 of the fixed supporting plate 15, tending to bring the movable plate 6 away of the turntable 18 which is between said plate and the fixed supporting plate 15. Said portion 40 solid with the fixed plate with its edge 41 forms an abutment for the movement of the movable plate 6 under the bias of the spring 38, said movable plate contacting said edge 41 by means of a rubber pad 42.

The movable plate 6 carries, integrally therewith, a knee-arm 43 overlying said plate and having at its free end a bore 44 in which a pivot 45 is housed with a wide clearance. Said pivot 45 has a hemispherical head 46 and carries at the other end a pressure member 47 which can be made, for example, of plastic material. A leaf spring 48 affixed at one end to the arm 43 acts with its opposite end on the head 46 of the pivot 45 and tends to keep the pressure member 47 approached to the movable plate 6.

Figure 5:
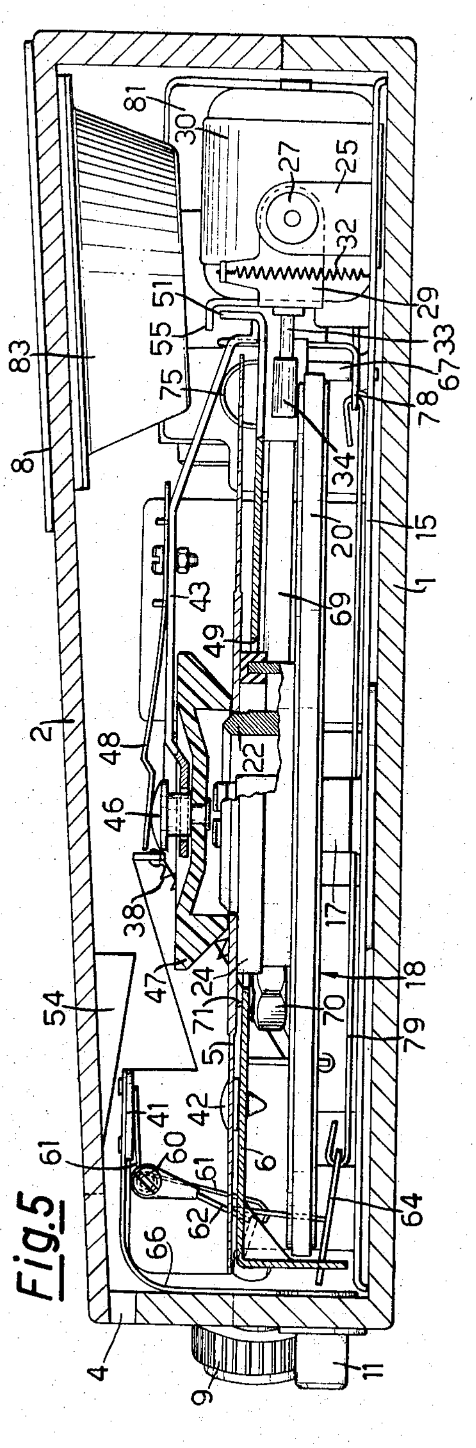
FIGURE 5 is a cross-sectional view taken along the line V—V of FIGURE 2, the mechanism inside the casing being shown in a record-playing position and partly in cross-section.

The orientation of the arm 43 is such that, in the position of the movable plate 6 in which the latter is approached to the turntable 18 and parallel to the plane thereof, the axis of the pivot 45 and of the pressure member 47 coincides with the axis of the fixed pivot 16 and of the turntable 18 (see FIG. 5).

A phonograph record 5 slipped into the device for being replayed is positioned between the movable plate 6 and the pressure member 47, as viewed in FIG. 5, and the latter, as the record is in its playback position, cooperates with said centering cylinder 22 having a conical mouth, as well as with the resting drum 23 so as firmly to retain the record 5. It should be noticed that in this playback position with the movable plate 6 approached to the turntable 18 and parallel thereto, the record does not rest any longer on the movable plate 6 but rests on the gasket 24 catered for on the edge of the drum 23, while the central bore of the record 5 is centered on the conical mouth of the cylinder 22. In order to permit to the record 5 to pass from the temporary resting surface afforded by the movable plate 6 to the resting surface afforded by the gasket 24 on the edge of the drum 23, the movable plate 6 has a circular opening 49 whose diameter is slightly larger than the outside diameter of the gasket 24 so that the latter gasket 24 and the conical edge of the centering cylinder 22 are allowed to pass through said opening 49 when the movable plate 6 is approached to the turntable 18.

To the ends of guiding and achieving a rough centering of the record 5 during the introduction thereof into the device through the mouth 3–4, the movable plate 6 has upwardly curled edges, indicated at 50, 51 and 52. Moreover, the curled portion 40 of the fixed plate 15 with a curled edge 53 is another guiding means for the record, and is roughly diametrically opposite to the edge 52 (see FIG. 2). Finally, the upper shell 2 of the casing has an inner wedge 54 (see FIG. 5) to ensure that an introduced record is slipped between the movable plate 6 and the pressure member 47.

The edge 51 of the movable plate 6 coacts, moreover, with a tag 55 solid with the frame 29 which carries the motor 30 so as to hold said frame against the bias of the springs 31 and 32. As the movable plate 6 is in its home position, i.e., away of the turntable 18, the edge 51 holds the motor 30 in such a position that the friction roller 34 as carried by the driving shaft 33 is away of the widened edge 20 of the gasket 19 of the turntable 18. When, contrarywise, the movable plate 6 is approached to the turntable 18 and parallel thereto, the edge 51 permits that the motor 30 be lowered under the bias of the springs 31 and 32 so that the friction roller 34 contacts said widened edge 20 and drives the turntable 18 to rotation. In this position, the tag 55 solid with the frame 29 no longer contacts the edge 51. The movable plate 6 has, in addition, an edge 56 curled in the direction towards the fixed plate 15, said edge 56 being intended to coact with the push-button 57 of a switch 58 (see FIG. 3) mounted on the fixed plate 15 and adapted to make and open the power circuit of the motor 30 as well as the circuit of the sound amplifier. On depressing the pushbutton 57 (the movable plate 6 is approached to the turntable 18), said electric circuits are made, the motor enters rotation and the playback can take place. When, conversely, the movable plate 6 is at home and the pushbutton 57 is released, said circuits are cut off and the motor is stationary.

To hold the movable plate 6, during replaying of a record, in the position approached to the turntable 18 and parallel thereto against the bias of the spring 38, a detent member is provided, which consists of a lever 59 (see FIGS. from 3 to 5) pivoted to the curled portion 40 of the fixed plate 15. About the pivot 60 of said lever 59 is coiled a spring 61 which, with one end, engages said lever and, with its opposite end, rests on the curled end 41 of the fixed portion 40. Said spring tends to rotate the lever 59 about the pivot 60 clockwise as viewed in the FIGURES from 3 to 5.

Figure 6:
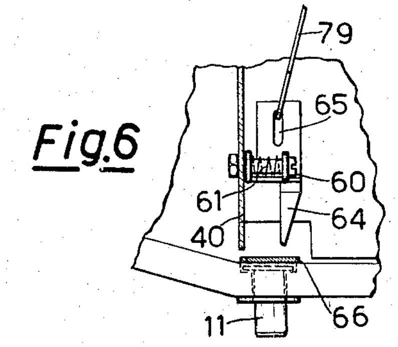
FIGURE 6 is a plan view of a detail of the device.

The lever 59 has a detent tooth 62 adapted to engage a tooth 63 catered for on the movable plate 6 as the latter is brought to the position approached to the turntable 18 and parallel thereto. At its free end, the lever 59 solidly carries a plate 64 which is terminated by a point on the side towards the casing of the device (see the detail in FIG. 6) and has an elongate slot 65 at its opposite side. The point of said plate 64 confronts an end of a leaf spring 66 bent through 90° approximately, said spring being affixed, at the opposite end, to the curled edge 41 of the fixed curled portion 40 solid with the fixed plate 15. The pushbutton 11 acts against said first end of the leaf spring 66 and, by depressing said button against the bias of the spring 66, it is possible to act, therethrough, on the point of the plate 64 so as to rotate the lever 59 anti-clockwise (as viewed in FIGS. from 3 to 5) against the bias of the spring 61. By so doing, it is possible to disengage at will the movable plate 6 when its tooth was engaged by the detent tooth 62 of the lever 59.

The fixed plate 15 solidly carries a pivot 67 whose axis is perpendicular to the plane of the plate. Said pivot 67 carries, freely rotatably about its own axis, a small frame 68 on which an arm 69 is mounted: said arm carries, at one end, the pick-up 70 with the needle or point 71 and, on the other end, a counterweight 72. The arm 69 is mounted on the frame 68 by means of two pins 73 and 74 (see FIG. 2) which are slipped, with a clearance, into bores specially provided in the arm. An arcuate spring 75 (see FIG. 4) acting between the arm 69 and the frame 68 tends to take up said clearance thus permitting that the arm may be swung with respect to the frame about the axis of the pins 73 and 74, said axis being perpendicular to the axis of the pivot 67 about which the frame and the arm can be caused to rotate. A spring 76 is expanded between the frame 68 and the end of the arm 69 which carries the counterweight 72 and tends to swing the arm about the axis of the pivots 73 and 74 so as to lift the pick-up needle 71 (as viewed in FIG. 4). Said oscillation is constrained by a curled edge of the frame 68 which serves as an abutment and passes through an opening of said arm so that the latter, urged by the spring 76, insists on the edge 77 as clearly viewed in FIG. 4.

The frame 68 has a projection 78 into which is hooked a clevis 79 with one of its end, the other end of said clevis being hooked into the elongate slot 65 of the plate 64 solid with the lever 59.

Figure 2:
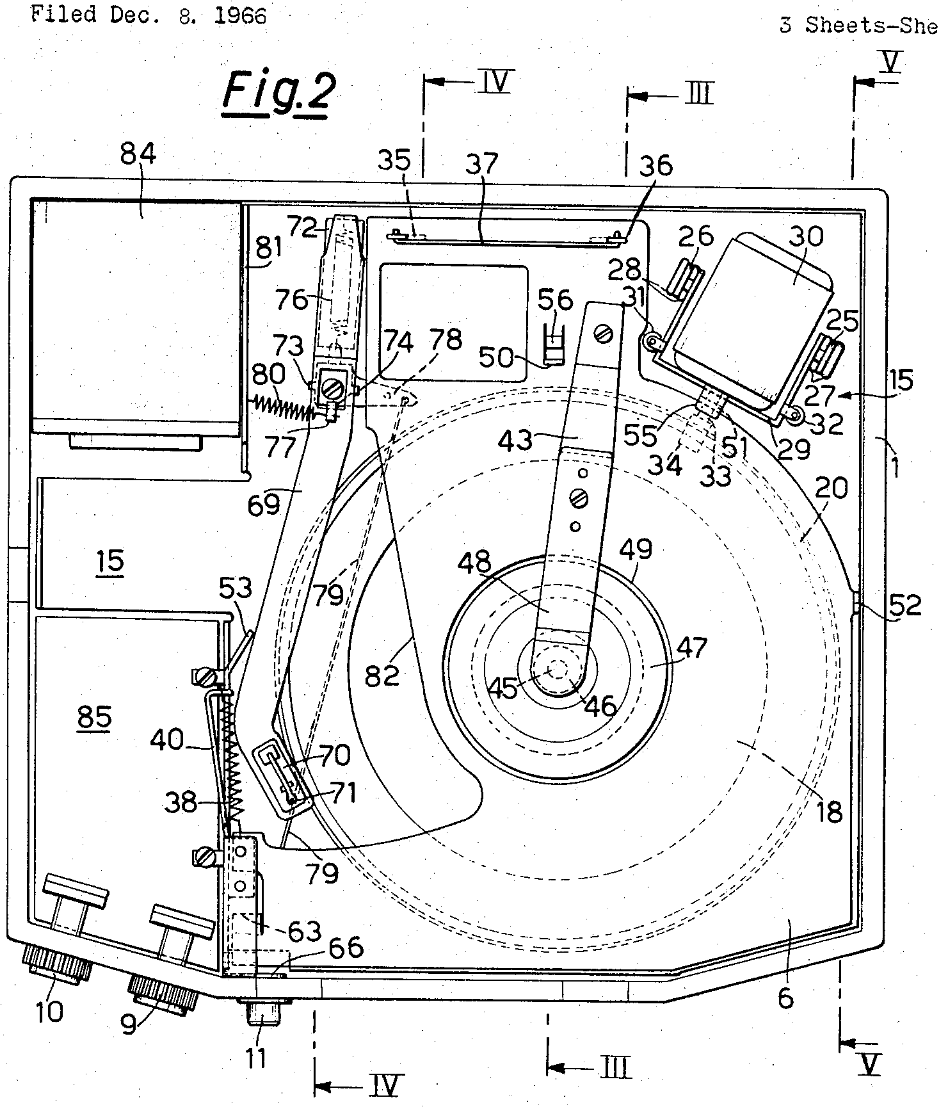
FIGURE 2 is a plan view of the same device, the upper half of the casing having been cut away along with the component parts solid therewith.

The organization of parts is such that the spring 61 which biases the lever 59 acts, through the clevis 79, on the frame 68 tending to rotate the arm 69 clockwise (as viewed in FIG. 2) about the pivot 67 until reaching an abutment formed by the edge 53 of the fixed portion 40 solid with the fixed plate 15. As the arm 69 rests on said abutment, as shown in FIG. 2, it is in the home position with the pickup needle 71 pointing upwardls. The spring 61 thus fulfills the function of restoring the arm 69 to said home position. When, during playback of a record, the movable plate 6 is approached to the turntable 18 and is held in said position by the detent tooth 62 of the lever 59, the bias of the spring 61 on the arm 69 is neutralized, said arm undergoing only the weak bias of a small spring 80 acting between the arm 69 and a curled portion 81 solid with the fixed plate 15. Only when the pickup needle 71 is in the last convolution of the record spiral and the tone arm 69 is rotated about the pivot 67 through a corresponding angle, the projection 78 of the frame 68 acts through the clevis 79 on the plate 64 solid with the lever 59 and, overcoming now the bias of the spring 61 (which caused the detent tooth 62 to engage the tooth 63 of the movable plate 6), slightly rotates the lever 59 thus automatically disengaging the movable plate 6. The rotation of the arm 69 with the pickup needle 71 from the home position to the end of playback of a record (ultimate convolution) is permitted by the shaped outline 82 of the movable plate 6.

When the movable plate 6 is shifted so as to approach the turntable 18 to begin playback of a record, the latter, resting on the drum 23 and being urged by the pressure member 47 slightly swings the arm 69 about the axis of the pins 73 and 74 so as to separate said arm from the abutment 77. Thus, the spring 76 becomes active, to keep the pickup needle 71 sticking to the face of the record 5 which confronts the turntable 18. It should be noticed that the home position of the arm 69 is such that the pickup needle 71 is exactly positioned in the initial convolution of the record to be replayed when the latter rests on the edge of the drum 23 and is centered by the cylinder 22.

The device is completed by a loudspeaker 83 affixed to the inside of the upper shell 2 of the casing, the batteries 84 for feeding the motor 30 and the amplifying circuit, an amplifier, preferably a transistorized one, situated in the receptacle indicated at 85. The electric connections are not shown in the drawings; inasmuch as they are quite conventional in the apertaining art, it is deemed redundant to disclose them in more detail.

The operation of the automatic record-player as shown is as follows:

The device is intended to play back phonograph records of a preselected diameter, having a central hole of a preselected diameter also. Moreover the device, as shown, is designed for a single rotational speed of the records being replayed, such as records to be played at 45 r.p.m.

In the home position of the device, the movable plate 6 is disengaged and is in its position away of the turntable 18, which is at standstill since so is the driving motor 30 and the friction roller 34 is separated from said turntable. The movable plate 6, with its undercut 7, can be seen through the record slot 3–4. Also the amplification circuit is broken. The device can take any spatial position, more particularly it can be laid flat on a desk or vertically carried by the user with the aid of the strap 13.

If it is now desired to replay a photograph record, the latter is slipped into the record slot 3–4 with the face one desires to play in front of the movable plate 6. During the introduction, the record 5 shall be slipped between the movable plate 6 and the pressure member 47 and is guided by the movable plate 6 and the guiding means 50, 51, 52, 53 and 54. As the record is wholly slipped into the device, the movable plate 6 is pressed in the point indicated at 86 in FIG. 1 until hearing the "click" of the detent which now holds said plate approached to and substantially parallel to the turntable 18. During the shift of the movable plate 6 from the original home position in which said plate is a temporary resting surface for the slipped-in record, to the position as locked by the detent member, the following steps take place automatically.

The edge 56 presses the pushbutton 57 of the switch 58 thus completing the electric circuit of the motor 30 and the amplifier. The motor is thus started. The edge 51 permits that the friction roller 34 be approached to the edge 20 of the turntable 18, the latter being driven to rotation along with the drum 23 and the centering cylinder 22.

These latter two members pass through the circular opening 49 of the movable plate 6 thus centering the record 5 relative to the turntable 18 and driving to rotation said record which is completely detached from its temporary resting surface (plate 6) and rests now on the gasket 24 of the edge of the drum 23. Centering and transfer of the record onto the new resting surface are aided by the pressure member 47 which, under the bias of the leaf spring 48, urges the record against the conical flare of the centering cylinder 22 and the edge of the resting drum 23 thus firmly holding the record thereon. The record thus starts its rotation, the pressure member 47 being also frictionally driven to rotation. The latter member is slightly axially shifted with respect to the arm 43 solid with the movable plate 6 so that its pivot 45 does not contact the bore 44 of the arm 43 but only the hemispherical head 46 thereof, thus transferring with a minimum friction the bias of the leaf spring 48 to the record 5 (see FIG. 5).

The tone ram 69 in its home position contacts, through the pickup needle 71 the face of the record 5 which confronts the turntable 18 and is slightly swung about the axis of the pins 73, 74 so as to separate said arm from the abutment 77 and to activate the spring 76 which urges the needle 71 against the record 5 with a proper pressure. By entering the spiral groove of the record, the needle 71 begins to play the record and the groove itself provides to swing the tone arm 69 about the axis of the pin 67 anticlockwise (as viewed in FIG. 2). During this step, the spring 61 is not active upon the tone arm which only undergoes the slight bias of the spring 80. By virtue of the counterweight 72, the tone arm 69 is exactly balanced with respect to its own axes of rotation and oscillation, the operability being thus assured irrespective of the spatial orientation of the device.

When the pickup needle 71 enters the ultimate spiral groove of the record being replayed, the clevis 79 which connects the arm 69 to the detent member of the movable plate 6 automatically disengages said plate: the latter, under the bias of the spring 38, is returned to its home position.

During the return movement of the movable plate 6 towards its home position, the operations described hereinabove are sequentially reversed. The record 5 is brought to rest on the movable plate 6 again and is restored therewith to the position away of the turntable 18. The tone arm 69 is limitedly swung about the axis of the pins 73, 74 until it is stopped against the edge 77 and remains separated from the record 5. The spring 61, via the clevis 79, causes the tone arm 69 to be reverted to its home position. The edge 51 of the movable plate 6, by acting on the tag 55 keeps the friction roller 34 away of the edge 20 of the turntable 18, the latter being thus stopped. The edge 56, in turn, unlocks the pushbutton 57 of the switch 58 which cuts the electric circuits both of the motor 30 and the amplifier.

The device is thus brought back to its home position.

The same result can be attained at any instant of time during playback, by merely depressing the pushbutton 11. As a matter of fact, the latter, through the end of the leaf spring 66, directly acts upon the detent member for the movable plate, thus causing the latter to be disengaged. Since the end of the clevis 79 is hooked into an elongate slot 65 of the plate 64, the pressure of the pushbutton 11 on said plate is not directly reflected onto the clevis 79, not on the tone arm 69, either.

The inventive automatic record player has been described in connection to a preferred, non-limiting embodiment, a number of constructional changes being possible without departing from the scope of the invention.

Thus, for example, the turntable-driving motor, instead of being supported by the plate affixed to the casing, could be mounted, with advantage, on the movable plate, thus encouraging the separation of said plate from the turntable in the inoperative position. The shift of the movable plate from the inoperative to the operative position could be controlled by means of a specially provided pushbutton.

The movable plate, on its side intended to contact the records, should preferably be velvet-coated so as to protect them. The same is true of the guiding wedge 54 applied inside the upper shell of the casing.

The amplifying circuit, loudspeaker, the circuitry for adjusting the volume and tone, etc. can be catered for in any known, conventional way.

The embodiments of the invention in which an exclusive property or privilege is claimed are defined as follows:

1. A portable record player comprising a casing, a slot formed through the casing wall for introducing the record to be replayed, a turntable freely rotatably supported within said casing, a small electric motor for driving said turntable to rotation via a friction roller, means for feeding power to said small motor via a switch, a rest drum and a centering cylinder having a conical flare for the record to be replayed, both coaxially mounted with said turntable and solid therewith, a shaped resting plate for temporarily receiving said record before playback and on completion thereof, said plate being positioned above said turntable and spaced apart therefrom, said plate being supported within said casing so as to be capable of being approached to the turntable, resilient means tending to keep said plate spaced apart from said turntable, a pickup arm with a needle pivotally supported about a pivot having its axis parallel to the axis of rotation of said turntable and capable of a restricted tilting movement about an axis perpendicular to its axis of rotation, resilient means acting on said pickup arm and tending to keep said needle spaced apart from the turntable plane, openings through said plate for allowing said resting drum to pass therethrough together with said centering cylinder and said pickup arm when said plate is approached to said turntable, a spring-biased pressure member freely rotatably carried by said plate and overlying said passageway for said resting drum and said centering cylinder and adapted to cooperate with them for holding a record in playback position when said plate is near said turntable, spring-biased members for retaining said plate in said position near said turntable, means for connecting said pickup arm with said retaining means so that at the end of record-playing, said retaining means are automatically released for disengaging said plate to allow it to revert to the position away of the turntable with the record, and means for closing the switch and feeding said small electric motor and for permitting the shifting of said friction roller from contacting said turntable when said plate is brought to its position near said turntable.

2. A portable record-player according to claim 1, wherein the temporary resting plate for the record is supported in a limitedly swingable manner about an axis parallel to the turntable plane in a supporting member affixed to said casing.

3. A record player according to claim 2, wherein said plate is swingably supported on the side away of said retaining means.

4. A record player according to claim 1, wherein a spring-biased pushbutton is provided, which is capable of acting on said retaining means for the plate so as to disengage the same at will.

5. A record player according to claim 4, wherein the means for connecting said pickup arm to said retaining means for said plate permit a limited lost-motion stroke of said retaining means.

6. A record player according ot claim 1, wherein said plate solidly carries a knee-arm having at its free end a bore for housing a pivot having a diameter less than that of said bore, said pressure member being affixed to said pivot, said pivot having a hemispherical head, a leaf spring being affixed to said arm solidly with the plate, said spring acting with its free end on the hemispherical head of said pivot.

7. A record player according to claim 1, wherein said pickup arm is supported by a frame so as to oscillate about an axis, said frame being rotatably mounted about a pin affixed to said casing, the axis of said pin being perpendicular to the axis of oscillation of said arm with respect to said frame, resilient means being provided between said frame and the end of said arm away of the end which carries the pickup needle, which tend to swing said arm with respect to said frame, said oscillation being constrained by an abutment carried by said frame.

8. A record player according to claim 7, wherein a clevis connects said frame to said resilient retaining means, said clevis being hooked to an elongate slot formed through said retaining means.

9. A record player according to claim 1, wherein said retaining means comprise a lever pivoted at a fixed point of said casing, a detent tooth solid with said lever, a tooth borne by said movable plate, and a spring acting between a fixed point of said casing and said lever and tending to keep both said teeth engaged as said plate is approached to said turntable.

10. A record player according to claim 1, wherein said motor is swingably supported about an axis parallel to the turntable plane in a supporting member affixed to said casing, resilient means being provided to oscillate said motor in the direction as to approach the friction roller carried by the driving shaft to the edge of the turntable and cooperating means being further provided on said motor and said movable plate to angularly shift said motor in the direction so as to bring said friction roller away of the turntable edge when said plate is in the position away of said turntable and to disengage said motor as said plate is approached to said turntable.

References Cited

UNITED STATES PATENTS

| | | | |
|---|---|---|---|
| 2,939,713 | 6/1960 | Winter | 274—9 |
| 3,223,422 | 12/1965 | Ernst | 274—9 |

HARRY N. HAROIAN, *Primary Examiner.*